(No Model.)
P. HERBERT.
TABLE LEG CONNECTION.
No. 425,948.  Patented Apr. 15, 1890.
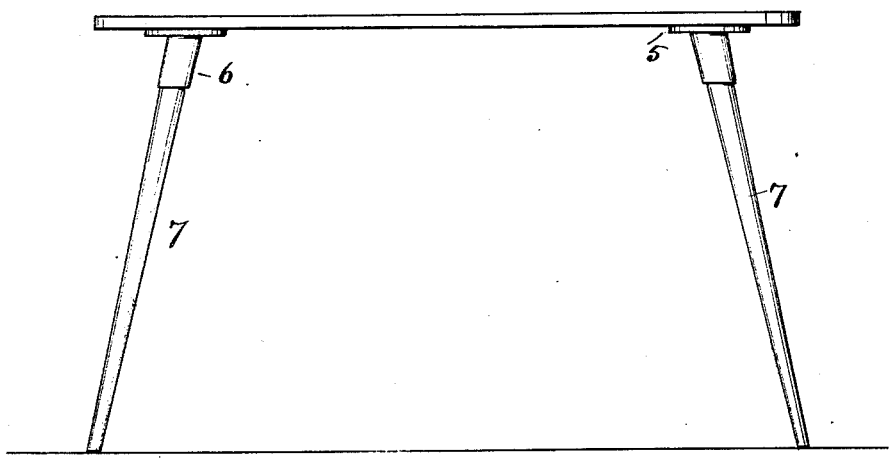
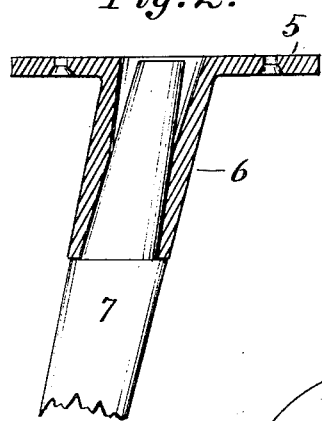
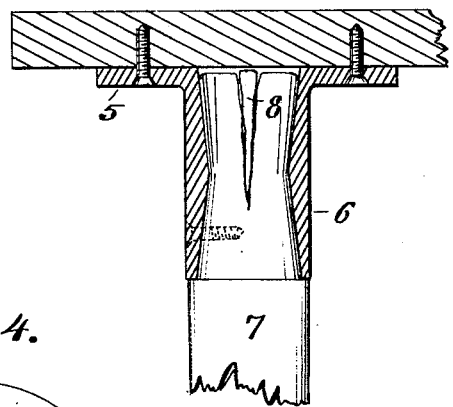
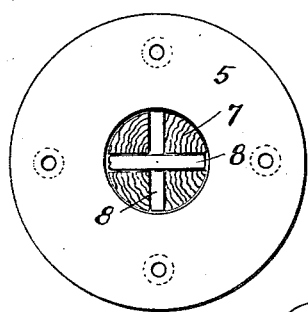
Witnesses
Allan F. Church
Lloyd T. Shaw
Inventor
Peter Herbert
By his Attorney
Carl Spengel

United States Patent Office.

PETER HERBERT, OF CINCINNATI, OHIO.

TABLE-LEG CONNECTION.

SPECIFICATION forming part of Letters Patent No. 425,948, dated April 15, 1890.

Application filed January 14, 1889. Serial No. 296,228. (No model.)

*To all whom it may concern:*

Be it known that I, PETER HERBERT, a citizen of the United States, residing at Cincinnati, in the county of Hamilton and State of Ohio, have invented certain new and useful Improvements in Table-Leg Connections; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to provide suitable means to connect table-legs to their respective tops, especially in such cases where the latter are very thin and a hole of sufficient depth could not be obtained in the top to keep the legs from moving or getting loose.

I attain my object in the construction illustrated in the accompanying drawings, in which—

Figure 1 is a side elevation of a table. Figs. 2 and 3 are enlarged sections of my connection. Fig. 4 is a top view of the same.

The connection is preferably made of cast-iron and has a flange 5, having perforations for screws or nails to pass through, by means of which it is fastened to the top. 6 is a sleeve of suitable length extending therefrom, either at right angles, as shown in Fig. 3, or, if the legs are inclined, as shown in Figs. 1 and 2, at any other necessary angle. The thickness of the material of this sleeve is increased from the two ends toward the center, so as to produce a double taper, as shown in Figs. 2 and 3.

The application of my connection is as follows: The upper end of leg 7 is tapered, so as to correspond and enter easily the sleeve from the lower end, as shown in Fig. 2. One or more wedges are then driven into the upper end of the leg, occupying the upper tapered portion of the sleeve, thereby splitting and spreading the leg, causing it to fill out closely said upper portion of the sleeve and securing leg and connection firmly together, the two forming one piece now, which is finally screwed or otherwise secured to the top of the table by means of the flange 5. For further securing the legs to their connections one or more screws may be put through the latter and into the former, as shown in dotted lines in Fig. 3.

It is not essential that the taper in the lower portion of sleeve 6 should correspond exactly with the taper in the upper portion where the end of the leg is split and spread. This lower portion has no further function than to produce the contraction inside the sleeve where it joins the upper tapered portion and to receive the part of the leg which is not spread.

I am aware that it is not new in implements such as picks or hammers to provide a socket adapted to enter the eye in the implement with a flaring portion, so that when the handle has been inserted a wedge is employed to displace or split the reduced portion of the handle and spread it in the flaring portion of the socket.

I claim as new and of my invention—

The socket for connecting table-legs to table-tops, having its bore contracted about midway of its length, so as to produce a flare or taper from said center in opposite directions, and also having an integral annular securing-flange at its upper end and provided with apertures to receive screws, in combination with a table-top secured to the flange so as to close from view the top of the socket and the table-leg secured therein by a wedge, substantially as specified.

In testimony whereof I affix my signature in presence of two witnesses.

PETER HERBERT.

Witnesses:
 CARL SPENGEL,
 ALLAN F. CHURCH.